(12) United States Patent
Shih et al.

(10) Patent No.: US 6,837,456 B1
(45) Date of Patent: Jan. 4, 2005

(54) MICROJET BASED CONTROL SYSTEM

(75) Inventors: Chiang Shih, Tallahassee, FL (US);
Farrukh S. Alvi, Tallahassee, FL (US);
Anjaneyulu Krothapalli, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 169 days.

(21) Appl. No.: 10/044,196

(22) Filed: Jan. 10, 2002

Related U.S. Application Data

(60) Provisional application No. 60/260,473, filed on Jan. 10, 2001.

(51) Int. Cl.[7] .......................... B64C 15/14; B64C 29/00
(52) U.S. Cl. ...................... 244/12.1; 60/263; 244/73 R
(58) Field of Search .............................. 244/12.1, 12.4, 244/12.5, 23 A, 73 R; 60/231, 263

(56) References Cited

U.S. PATENT DOCUMENTS

| | | | |
|---|---|---|---|
| 2,799,990 A | 7/1957 | Hausmann | 60/35.55 |
| 3,325,121 A | 6/1967 | Banuszuk et al. | 244/322 |
| 3,414,077 A * | 12/1968 | Earl | 180/128 |
| 3,446,023 A | 5/1969 | Mosier | 60/257 |
| 3,446,436 A | 5/1969 | Dejordiss et al. | 239/265.25 |
| 3,502,285 A | 3/1970 | Gambill | 244/3.22 |
| 3,660,981 A | 5/1972 | Stevens | 60/226 R |
| 3,740,003 A | 6/1973 | Ayre et al. | 244/3.22 |
| 4,003,531 A | 1/1977 | Fink | 244/3.22 |
| 4,274,610 A | 6/1981 | Bastian | 244/322 |
| 4,306,412 A | 12/1981 | Kless | 60/204 |
| 5,720,453 A * | 2/1998 | Platt | 224/23 D |
| 6,290,184 B1 | 9/2001 | Paterro | 244/172 |

OTHER PUBLICATIONS

AIAA 2000–2236, Active Control of Supersonic Impinging Jets Using Microjets, F.S. Alvi, R. Elavarusan, C. Shih, G. Gary and A. Krothupulli Jun. 19, 2000.

* cited by examiner

*Primary Examiner*—Robert P. Swiatek
(74) *Attorney, Agent, or Firm*—Peter Loffler

(57) ABSTRACT

A microjet based control system helps control the feedback loop that is created by an impinging jet of a STOVL aircraft. A plurality of microjets circumferentially encompass the outer periphery of the impinging jet and each issues a jet flow toward the jet flow created by the impinging jet. A control system is connected to the microjets for adaptively controlling the microjets based on various operating parameters collected by various input devices.

76 Claims, 4 Drawing Sheets

MICROJET BASED CONTROL SYSTEM

This application claims the benefit of U.S. Provisional Patent Application No. 60/260,473 filed on Jan. 10, 2001.

The U.S. Government has a paid-up license in this invention and the right in limited circumstances to require the patent owner to license others on reasonable terms as provided for by the terms of AFOSR Grant # F49620-00-1-0141 awarded by the United States Air Force.

BACKGROUND OF THE INVENTION

1. Field of the Invention

The present invention relates to a microjet based control system for the control of a feedback loop created by an impinging jet of a STOVL aircraft.

2. Background of the Prior Art

When a Short Takeoff and Vertical Landing (STOVL) aircraft is in hover mode in close proximity to the ground, the lift force is produced by the downward pointing lift jets (impinging jets) which jets are located on either side of the aircraft and which produce a high speed hot flow that impinges on the ground. It is well known that under these conditions, several flow-induced effects can emerge which can substantially diminish the performance of the aircraft. Specifically, a significant lift loss can be induced due to flow entrainment by the lifting jets from the ambient environment near the airframe of the aircraft. Additional problems that can occur include severe ground erosion that can be occasioned from the downflow being issued by the impinging jets, as well as hot gas ingestion into the engine inlets. Furthermore, the impinging flow field usually generates significantly higher noise levels relative to that of a free jet operating under similar conditions. Increased overall sound pressure levels are associated with high speed impinging jets and these increased levels can pose an environmental pollution problem and can adversely affect the integrity of the structural elements in the vicinity of the nozzle exhaust due to acoustic loading. The noise and unsteady pressure fields created by the impinging flow are frequently dominated by high amplitude discrete tones which can match the resonant frequencies of the aircraft panels, increasing the criticality of sonic fatigue.

The presence of multiple impinging jets can potentially further aggravate the above noted effects due to the strong coupling between the jet flows and the emergence of an upwardly moving fountain flow that flows in opposing direction relative to the impinging jet flow, toward the aircraft.

Obviously these negative effects need to be controlled in order to minimize their adverse influence on aircraft performance. In order to arrive at an effective control scheme to minimize or eliminate these undesired characteristics, an understanding of the physical mechanisms governing these flows is required.

Early studies have found that the unsteady characteristics of the impinging jets are dominated by the presence of discrete impingement tones. These high amplitude tones are generated by highly coherent instability waves as a result of the emergence of a self-sustained feedback loop. Impingement on the wall of the large vertical structures will generate coherent pressure fluctuations, which result in acoustic waves that travel through ambient medium and upon reaching the jet nozzle (a region of high receptivity), excite the shear layer of the jet. This leads to the generation of a new set of enhanced instability waves, thus closing the feedback loop.

Other studies have found an intimate connection between the discrete impinging tones and the highly unsteady oscillatory behavior of the impinging jet column. Through the generation of large scale structures in the jet shear layer, the feedback phenomenon might also be responsible for lift loss on the surfaces in the vicinity of the jet nozzle. These structures induce higher entrainment velocities that lead to lower surface pressures in the jet vicinity and, consequently, a significant lift loss.

Further studies have found the emergence of discrete peeks in the spectra of the unsteady surface pressures which match the impinging tone frequencies in the near-field acoustic measurements. This suggests that these feedback loop driven flow instabilities are also responsible for the unsteady loads on the ground plane. Unsteady loads as high as 190 dB have been found, which, coupled with the high temperatures associated with lifting jets, can further aggravate the ground erosion problem.

It is apparent from the above, that in order to effectively eliminate these undesirable effects of the impinging jet flows, the feedback loop needs to be weakened or outright eliminated. Several potential candidates emerge for achieving optimal control of the flow. One method intercepts the upstream propagating acoustic waves so that they cannot complete the feedback loop. Another method involves manipulation of the shear layer (e.g., increasing the thickness of the layer) near the nozzle lip thereby reducing its receptivity to the acoustic disturbances. Yet another method involves exciting the shear layer using pulsating high energy sources to disrupt the coherent interaction between the flow instabilities and the acoustic field.

A few attempts have been made to suppress the feedback loop. One such attempt suppressed edge tones in low speed flows, which are governed by a similar feedback mechanism, by placing two plates normal to the centerline of the jet. A similar technique was used to attenuate the feedback loop by introducing a control plate near the nozzle exit. The control plate was able to intercept the upstream propagating acoustic waves in order to disrupt the feedback loop, hence weakening the formation of the large scale structure of the jet flow. This passive control approach recovered a maximum of approximately 16 percent of the lift loss and an approximate 6–7 dB reduction in the overall sound pressure levels. While these passive control techniques look promising, significant performance gains were confined to a limited range of operating conditions. This is due to the fact that a relatively small change in the nozzle-to-ground separation can lead to a significant change in the magnitude and frequency of the tones that are responsible for the undesired results.

Therefore, it is apparent that any efficient control technique aimed at suppressing the feedback loop must be active and capable of adapting to a shift in frequencies/wavelengths of the modes that lock onto the feedback loop.

One attempt used a high speed co-flow with the impinging jet flow to shield the main jet flow from the near field acoustic disturbances. This attempt saw a reduction of approximately 10–15 dB in the near field broadband noise level in addition to the suppression of impinging tones. While this attempt was effective, it required a high mass flow rate of the co-flow jet, a minimum of approximate 20–25 percent of the main jet mass flux. Another attempt used counterflow near the jet nozzle exit to successfully suppress screech tones of non-ideally expanded jets. This attempt achieved an approximately 3–4 dB noise reduction and enhanced the mixing of the primary jet.

However, each of the above active control schemes require substantial additional design modifications and/or high operating power rendering them impractical for aircraft implementation.

SUMMARY OF THE INVENTION

The microjet based control system of the present invention uses a control-on-demand strategy for controlling or outright eliminating the feedback loop created by an impinging jet of a STOVL aircraft. The impinging jet has an exhaust port that has an outer periphery and that issues a first jet flow generally in the lower wing surface facing direction. The first jet flow of the impinging jet has a first jet flow mass;

A plurality of microjets are provided circumferentially about and proximate to the exhaust port, each microjet issuing a second jet flow. The plurality of microjets are used to adaptively control the feedback loop whenever the feedback loop is created by the jet. The second jet flows that are issued by the plurality of microjets flow toward the first jet flow. Each second jet flow has a second jet flow mass such that the combined second jet flow masses are substantially less then the first jet flow mass on the order of less then 20 percent of the first jet flow mass. Each second jet flow is supersonic. Input data is provided for use in adaptively controlling the plurality of microjets. The input data is collected by a high frequency response pressure transducer, a pressure tap, a sensor, etc. The plurality of microjets are fluid flow connected to a high pressure gas source held by the airframe. A plenum has an input port fluid flow connected to the high pressure gas source and a plurality of output ports, each fluid flow connected to a respective one of the microjets. A control valve is used for controlling the plenum. The control system for adaptively controlling the microjets controls the valve of each plenum used for controlling gas flow rates and pressures.

BRIEF DESCRIPTION OF THE DRAWINGS

Similar reference numerals refer to similar parts throughout the several views of the drawings.

DESCRIPTION OF THE PREFERRED EMBODIMENT

Figure 1:
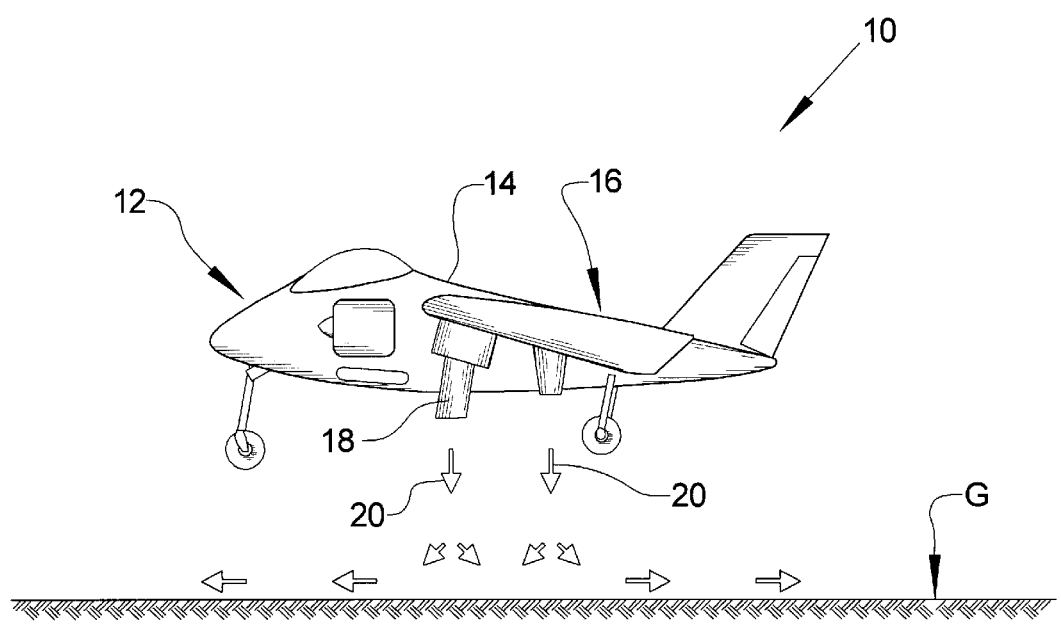
FIG. 1 is an environmental view of a typical STOVL aircraft near the ground.
Figure 2:
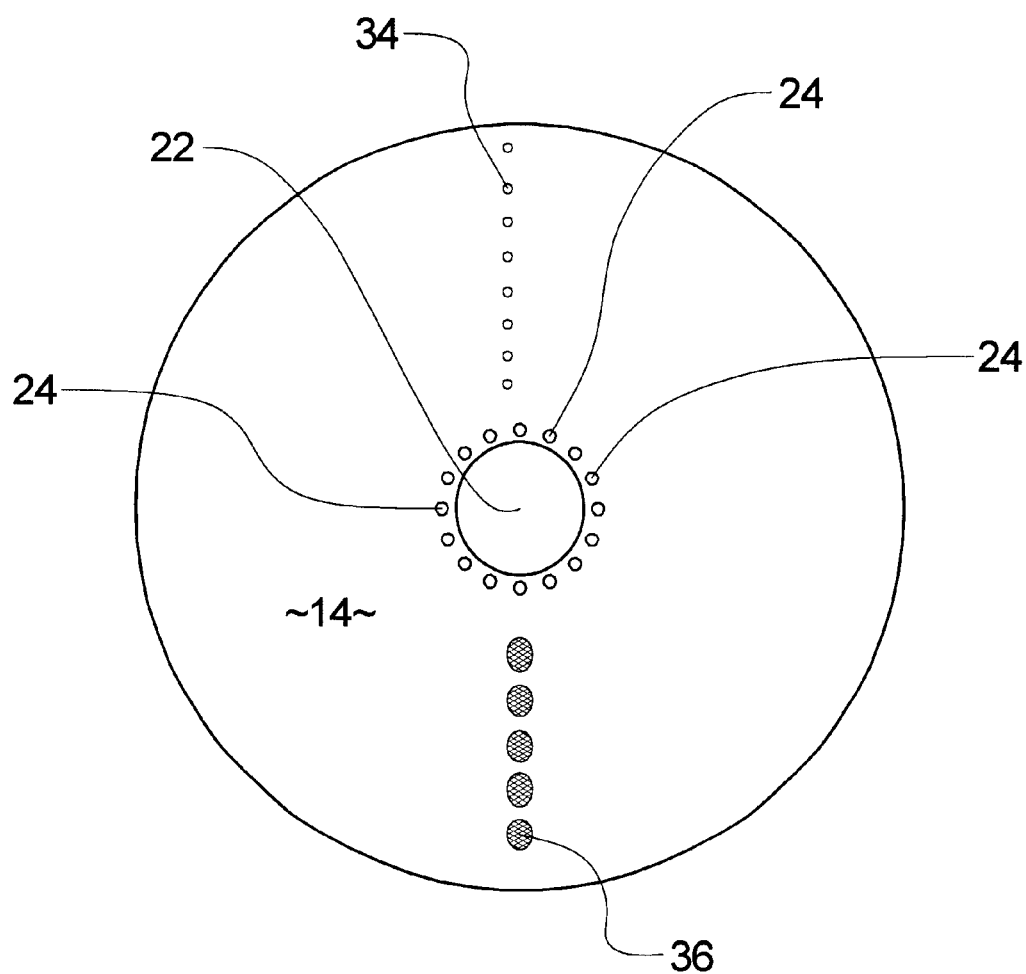
FIG. 2 is a plan view of the microjet based control system installed about a jet.
Figure 3:
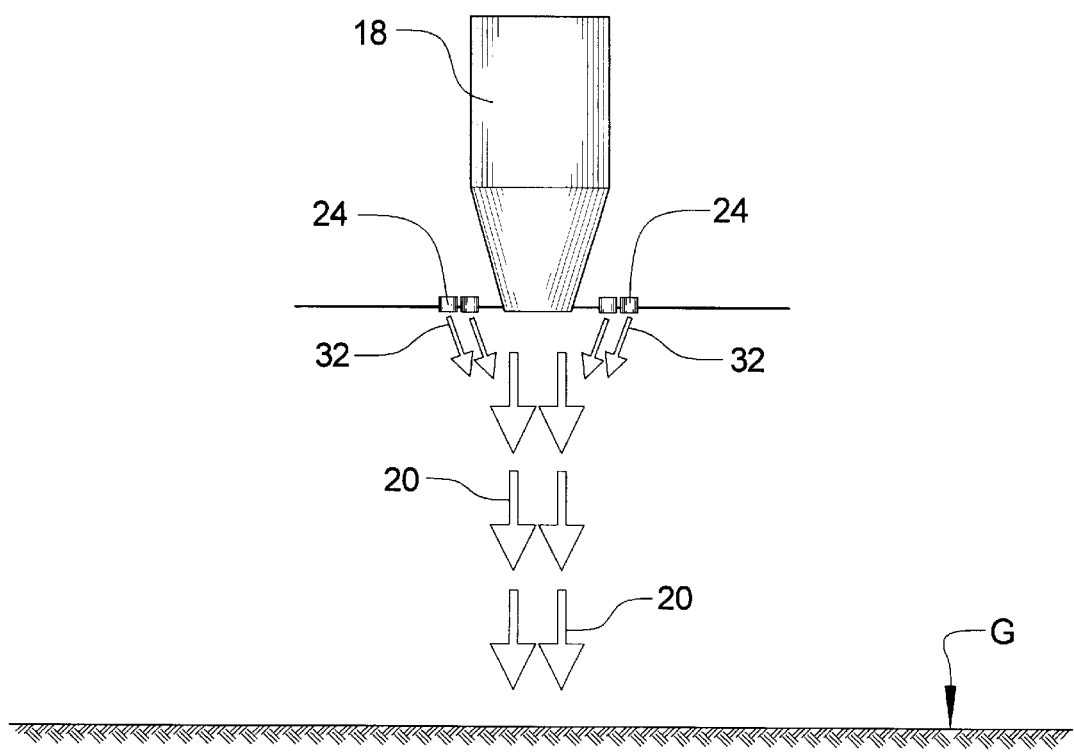
FIG. 3 is a side view of the microjet based control system installed about a jet.
Figure 4:
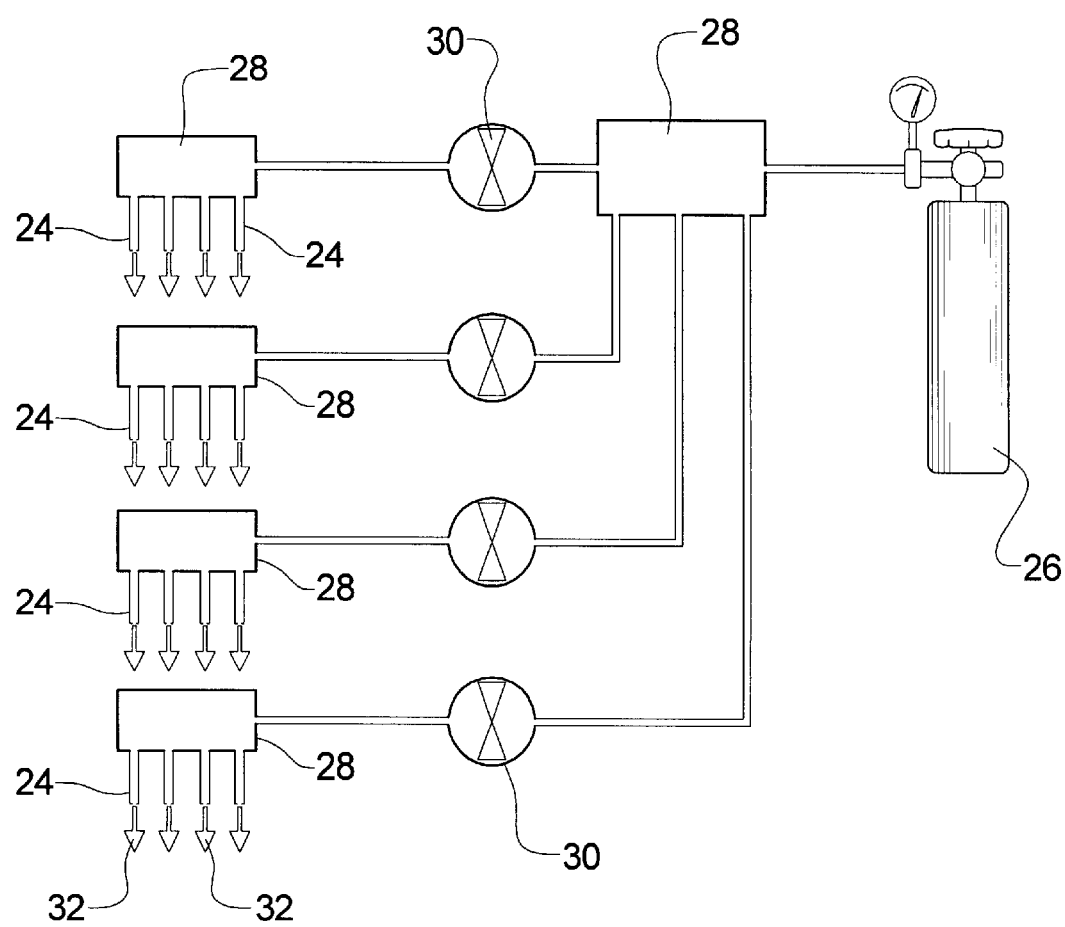
FIG. 4 is a schematic view of the microjet based control system.

Referring now to the drawings, it is seen that the microjet based control system of the present invention, generally denoted by reference numeral 10, is installed on a typical aircraft 12 that possesses short takeoff and vertical landing capabilities. As seen in FIG. 1, such an aircraft 12 has an airframe 14, a pair of leading wings 16 and at least one impinging jet 18 on each side of the airframe 14 and typically located on or proximate the wings 16. These impinging jets 18, which may also be responsible for the forward thrust of the aircraft 12 during normal flight with the jets being turned into appropriate position during the takeoff and landing procedure or the impinging jets 18 may be separate from the forward thrust jets of the aircraft 12. During the takeoff and landing procedure, each impinging jet 18 issues a jet flow 20, through the jet's exhaust port 22, the jet flow 20 being vectored generally toward the ground which jet flow 20 allows the aircraft to takeoff and land in a generally vertical fashion or over a relatively short distance.

Located in the vicinity of the jet's exhaust port 22 are one or more microjets 24. In order to reduce drag, the microjets 24 will be generally flush mounted within the air frame 14 of the aircraft 12. Each microjet 24 is located circumferentially around the periphery of the exhaust port 22 of the impinging jet 18 a short distance away from the exhaust port 22. Each microjet 24 has an opening diameter substantially smaller than the diameter of the exhaust port 22 of the impinging jet, the particular microjet opening diameter can be scaled depending on the parameters of the particular system in which the microjets 24 are used. Each microjet 24 is connected to a source 26 of high pressure gas. This high pressure gas source 26 can be stored in a pressurized tank or the high pressure gas or can be obtained from the bleed or bypass gases or other appropriate source within the aircraft in appropriate fashion. Each microjet 24 can be directly connected to the high pressure gas source 26 or can be connected by one or a series of plenums 28. An appropriate control valve 30 controls gas flow communication between the microjet 24 and the gas source 26. Each control valve 30, which may be of any appropriate design, can control an individual microjet 24, each control valve 30 can control gas flow communication to a plenum 28 having multiple microjets 24, or each control valve 30 controls a bank of plenums 28. Each control valve 30 will control gas flow rates and pressures.

In operation, during the takeoff or landing of the aircraft 12, when the impinging jet 18 is issuing the downward jet flow 20, some or all of the microjets 24 are activated. Each microjet 24 that is activated issues a jet flow 32 toward the jet flow 20 of the impinging jet 18. The jet flow 32 issued by the microjet 24 is supersonic and the sum total of the jet flow mass of all the microjets 24 is substantially less than the jet mass flow of the impinging jet 18. The jet flow 32 of the microjets disrupts and minimizes the negative effects created by the feedback loop of the jet flow 20 of the impinging jet 18. The precise control of each microjet including activation and deactivation of each microjet 24 or plenum 28 of microjets 24 will be adaptively controlled and will be based on the particular operating conditions, including impinging jet thrust, distance between the aircraft 12 and the ground G, the ambient air pressure, mean pressure distribution on the lift plate 14, the unsteady pressure loads, etc. In order to provide system inputs for adaptive control of the microjets 24, one or more high frequency response pressure transducers 34 or other appropriate sensors 36 can be located on the air frame 14 in order to measure the unsteady pressure loads on the air frame 14. Other sensors can be provided as needed.

While the invention has been particularly shown and described with reference to an embodiment thereof, it will be appreciated by those skilled in the art that various changes in form and detail may be made without departing from the spirit and scope of the invention.

What is claimed is:

1. A microjet system comprising:
   a jet having an exhaust port that has an outer periphery, the jet issuing a first jet flow having a first jet flow mass;
   a plurality of microjets located circumferentially about the exhaust port, each microjet issuing a second jet flow;
   a plenum having an input port fluid flow connected to a high pressure gas source and a plurality of output ports, each output port fluid flow connected to a respective one of the plurality of microjets;

a control valve for controlling the plenum; and wherein the plurality of microjets controls a feedback loop whenever the feedback loop is created by the jet.

2. The microjet system as in claim 1 wherein each of the second jet flows that is issued by the plurality of microjets flows toward the first jet flow.

3. The microjet system as in claim 1 wherein each second jet flow has a second jet flow mass and wherein the combined second jet flow masses are substantially less then the first jet flow mass.

4. The microjet system as in claim 3 wherein the combined second jet flow masses are less then 20 percent of the first jet flow mass.

5. The microjet system as in claim 1 wherein each second jet flow is supersonic.

6. The microjet system as in claim 1 further comprising a control system connected to the plurality of microjets for adaptively controlling the microjets.

7. The microjet system as in claim 6 further comprising input means for providing input data to the control system for use by the control system in providing adaptive control of the plurality of microjets.

8. The microjet system as in claim 7 wherein the input means is selected from the group consisting of a high frequency response pressure transducer, a pressure tap, and a sensor.

9. The microjet system as in claim 1 wherein the plurality of microjets are fluid flow connected to a high pressure gas source.

10. The microjet system as in claim 1 further comprising a control system connected to the control valve for adaptively controlling the microjets.

11. The microjet system as in claim 10 further comprising input means for providing input data to the control system for use by the control system in controlling the control valve.

12. The microjet system as in claim 11 wherein the input means is selected from the group consisting of a high frequency response pressure transducer, a pressure tap, and a sensor.

13. A microjet system comprising:

an airframe having a fuselage and a pair of wings having a leading edge, a trailing edge, an upper surface and a lower surface;

a jet, attached to the airframe, the jet having an exhaust port that has an outer periphery, the jet issuing a first jet flow generally in the lower surface facing direction, the first jet flow having a first jet flow mass;

a plurality of microjets secured to the airframe and located circumferentially about the exhaust port, each microjet issuing a second jet flow, each second jet flow flows toward the first jet flow; and wherein the plurality of microjets controls a feedback loop whenever the feedback loop is created by the jet.

14. The microjet system as in claim 13 wherein each second jet flow has a second jet flow mass and wherein the combined second jet flow masses are substantially less then the first jet flow mass.

15. The microjet system as in claim 14 wherein the combined second jet flow masses are less then 20 percent of the first jet flow mass.

16. The microjet system as in claim 13 wherein each second jet flow is supersonic.

17. The microjet system as in claim 13 further comprising a control system held by the airframe and connected to the plurality of microjets for adaptively controlling the microjets.

18. The microjet system as in claim 17 further comprising input means for providing input data to the control system for use by the control system in providing adaptive control of the plurality of microjets.

19. The microjet system as in claim 18 wherein the input means is selected from the group consisting of a high frequency response pressure transducer, a pressure tap, and a sensor.

20. The microjet system as in claim 13 wherein the plurality of microjets are fluid flow connected to a high pressure gas source held by the airframe.

21. The microjet system as in claim 20 further comprising:

a plenum held by the airframe and having an input port fluid flow connected to the high pressure gas source and a plurality of output ports, each output port fluid flow connected to a respective one of the plurality of microjets;

and a control valve held by the airframe for controlling the plenum.

22. The microjet system as in claim 21 further comprising a control system held by the airframe, the control system, connected to the control valve for adaptively controlling the microjets.

23. The microjet system as in claim 22 further comprising input means for providing input data to the control system for use by the control system in controlling the control valve.

24. The microjet system as in claim 23 wherein the input means is selected from the group consisting of a high frequency response pressure transducer, a pressure tap, and a sensor.

25. A method of controlling a feedback loop created by impinging jet flow comprising the steps of:

providing an airframe having a fuselage and a pair of wings having a leading edge, a trailing edge, an upper surface and a lower surface;

providing a jet having an exhaust port that has an outer periphery, the jet issuing a first jet flow generally in the lower surface facing direction, the first jet flow having a first jet flow mass;

attaching the jet to the airframe;

providing a plurality of microjets circumferentially about the exhaust port, each microjet issuing a second jet flow, each second jet flow flows toward the first jet flow; and using the plurality of microjets to control the feedback loop whenever the feedback loop is created by the jet.

26. The method as in claim 25 wherein each second, jet flow has a second jet flow mass and wherein the combined second jet flow masses are substantially less then the first jet flow mass.

27. The method as in claim 26 wherein the combined second jet flow masses are less then 20 percent of the first jet flow mass.

28. The microjet based control system as in claim 25 wherein each second jet flow is supersonic.

29. The method as in claim 25 further comprising the step of adaptively controlling the plurality of microjets.

30. The method as in claim 29 further comprising the step of providing input data for use in adaptively controlling the plurality of microjets.

31. The method as in claim 30 wherein the input data is provided by a high frequency response pressure transducer, a pressure tap, or a sensor.

32. The method as in claim 25 wherein the plurality of microjets are fluid flow connected to a high pressure gas source held by the airframe.

33. The method as in claim 32 further comprising the steps of:
   providing a plenum having an input port and a plurality of output ports;
   fluid flow connecting the input port to the high pressure gas source;
   fluid flow connecting each output port to a respective one of the plurality of microjets; and
   providing a control valve for controlling the plenum.

34. The method as in claim 33 further comprising the step of adaptively controlling the plurality of microjets via the control valve.

35. The method as in claim 34 further comprising the step of providing input data for use in adaptively controlling the plurality of microjets.

36. The method as in claim 35 wherein the input data is provided by a high frequency response pressure transducer, a pressure tap, or a sensor.

37. A microjet system comprising:
   an airframe having a fuselage and a pair of wings having a leading edge, a trailing edge, an upper surface and a lower surface;
   a jet, attached to the airframe, the jet having an exhaust port that has an outer periphery, the jet issuing a first jet flow generally in the lower surface facing direction, the first jet flow having a first jet flow mass;
   a plurality of microjets secured to the airframe and located circumferentially about the exhaust port, each microjet issuing a second jet flow, which jet flow is supersonic; and
   wherein the plurality of microjets controls a feedback loop whenever the feedback loop is created by the jet.

38. The microjet system as in claim 37 wherein each second jet flow has a second jet flow mass and wherein the combined second jet flow masses are substantially less then the first jet flow mass.

39. The microjet system as in claim 38 wherein the combined second jet flow masses are less then 20 percent of the first jet flow mass.

40. The microjet system as in claim 37 further comprising a control system held by the airframe and connected to the plurality of microjets for adaptively controlling the microjets.

41. The microjet system as in claim 40 further comprising input means for providing input data to the control system for use by the control system in providing adaptive control of the plurality of microjets.

42. The microjet system as in claim 41 wherein the input means is selected from the group consisting of a high frequency response pressure transducer, a pressure tap, and a sensor.

43. The microjet system as in claim 37 wherein the plurality of microjets are fluid flow connected to a high pressure gas source held by the airframe.

44. The microjet system as in claim 43 further comprising:
   a plenum held by the airframe and having an input port fluid flow connected to the high pressure gas source and a plurality of output ports, each output port fluid flow connected to a respective one of the plurality of microjets;
   and a control valve held by the airframe for controlling the plenum.

45. The microjet system as in claim 44 further comprising a control system held by the airframe, the control system, connected to the control valve for adaptively controlling the microjets.

46. The microjet system as in claim 45 further comprising input means for providing input data to the control system for use by the control system in controlling the control valve.

47. The microjet system as in claim 46 wherein the input means is selected from the group consisting of a high frequency response pressure transducer, a pressure tap, and a sensor.

48. A microjet system comprising:
   an airframe having a fuselage and a pair of wings having a leading edge, a trailing edge, an upper surface and a lower surface;
   a jet, attached to the airframe, the jet having an exhaust port that has an outer periphery, the jet issuing a first jet flow generally in the lower surface facing direction, the first jet flow having a first jet flow mass;
   a plurality of microjets secured to the airframe and located circumferentially about the exhaust port, each microjet connected to a high pressure gas source held by the airframe and each mircojet issuing a second jet flow;
   a plenum held by the airframe and having an input port fluid flow connected to the high pressure gas source and a plurality of output ports, each output port fluid flow connected to a respective one of the plurality of microjets;
   a control valve held by the airframe for controlling the plenum; and
   wherein the plurality of microjets controls a feedback loop whenever the feedback loop is created by the jet.

49. The microjet system as in claim 48 wherein each second jet flow has a second jet flow mass and wherein the combined second jet flow masses are substantially less then the first jet flow mass.

50. The microjet system as in claim 49 wherein the combined second jet flow masses are less then 20 percent of the first jet flow mass.

51. The microjet system as in claim 48 further comprising a control system held by the airframe and connected to the plurality of microjets for adaptively controlling the microjets.

52. The microjet system as in claim 51 further comprising input means for providing input data to the control system for use by the control system in providing adaptive control of the plurality of microjets.

53. The microjet system as in claim 52 wherein the input means is selected from the group consisting of a high frequency response pressure transducer, a pressure tap, and a sensor.

54. The microjet system as in claim 48 further comprising a control system held by the airframe, the control system, connected to the control valve for adaptively controlling the microjets.

55. The microjet system as in claim 54 further comprising input means for providing input data to the control system for use by the control system in controlling the control valve.

56. The microjet system as in claim 55 wherein the input means is selected from the group consisting of a high frequency response pressure transducer, a pressure tap, and a sensor.

57. A method of controlling a feedback loop created by impinging jet flow comprising the steps of:
   providing an airframe having a fuselage and a pair of wings having a leading edge, a trailing edge, an upper surface and a lower surface;
   providing a jet having an exhaust port that has an outer periphery, the jet issuing a first jet flow generally in the lower surface facing direction, the first jet flow having a first jet flow mass;

attaching the jet to the airframe;

providing a plurality of microjets circumferentially about the exhaust port, each microjet issuing a second jet flow, which second jet flow is supersonic; and using the plurality of microjets to control the feedback loop whenever the feedback loop is created by the jet.

58. The method as in claim 57 wherein each second jet flow has a second jet flow mass and wherein the combined second jet flow masses are substantially less then the first jet flow mass.

59. The method as in claim 58 wherein the combined second jet flow masses are less then 20 percent of the first jet flow mass.

60. The method as in claim 57 further comprising the step of adaptively controlling the plurality of microjets.

61. The method as in claim 60 further comprising the step of providing input data for use in adaptively controlling the plurality of microjets.

62. The method as in claim 61 wherein the input data is provided by a high frequency response pressure transducer, a pressure tap, or a sensor.

63. The method as in claim 57 wherein the plurality of microjets are fluid flow connected to a high pressure gas source held by the airframe.

64. The method as in claim 63 further comprising the steps of:

providing a plenum having an input port and a plurality of output ports;

fluid flow connecting the input port to the high pressure gas source;

fluid flow connecting each output port to a respective one of the plurality of microjets; and providing a control valve for controlling the plenum.

65. The method as in claim 64 further comprising the step of adaptively controlling the plurality of microjets via the control valve.

66. The method as in claim 65 further comprising the step of providing input data for use in adaptively controlling the plurality of microjets.

67. The method as in claim 66 wherein the input data is provided by a high frequency response pressure transducer, a pressure tap, or a sensor.

68. A method of controlling a feedback loop created by impinging jet flow comprising the steps of:

providing an airframe having a fuselage and a pair of wings having a leading edge, a trailing edge, an upper surface and a lower surface;

providing a jet having an exhaust port that has an outer periphery, the jet issuing a first jet flow generally in the lower surface facing direction, the first jet flow having a first jet flow mass;

attaching the jet to the airframe;

providing a plurality of microjets circumferentially about the exhaust port, each microjet connected to a high pressure gas source held by the airframe and each mircojet issuing a second jet flow;

providing a plenum having an input port and a plurality of output ports;

fluid flow connecting the input port to the high pressure gas source;

fluid flow connecting each output port to a respective one of the plurality of microjets; and providing a control valve for controlling the plenum; and using the plurality of microjets to control the feedback loop whenever the feedback loop is created by the jet.

69. The method as in claim 68 wherein each second jet flow has a second jet flow mass and wherein the combined second jet flow masses are substantially less then the first jet flow mass.

70. The method as in claim 69 wherein the combined second jet flow masses are less then 20 percent of the first jet flow mass.

71. The method as in claim 68 further comprising the step of adaptively controlling the plurality of microjets.

72. The method as in claim 71 further comprising the step of providing input data for use in adaptively controlling the plurality of microjets.

73. The method as in claim 72 wherein the input data is provided by a high frequency response pressure transducer, a pressure tap, or a sensor.

74. The method as in claim 68 further comprising the step of adaptively controlling the plurality of microjets via the control valve.

75. The method as in claim 74 further comprising the step of providing input data for use in adaptively controlling the plurality of microjets.

76. The method as in claim 75 wherein the input data is provided by a high frequency response pressure transducer, a pressure tap, or a sensor.

* * * * *